(12) United States Patent
Stewart

(10) Patent No.: US 11,733,415 B2
(45) Date of Patent: Aug. 22, 2023

(54) PARALLELIZATION OF SEISMIC DATA-RELATED MODELLING

(71) Applicant: Saudi Arabian Oil Company, Dhahran (SA)

(72) Inventor: Simon A. Stewart, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/035,428

(22) Filed: Sep. 28, 2020

(65) Prior Publication Data

US 2022/0099854 A1 Mar. 31, 2022

(51) Int. Cl.
*G01V 1/34* (2006.01)
*G01V 1/28* (2006.01)
*G01V 1/30* (2006.01)

(52) U.S. Cl.
CPC .............. *G01V 1/345* (2013.01); *G01V 1/282* (2013.01); *G01V 1/303* (2013.01); *G01V 2210/6222* (2013.01)

(58) Field of Classification Search
CPC ........ G01V 1/345; G01V 1/282; G01V 1/303; G01V 2210/6222
See application file for complete search history.

(56) References Cited

U.S. PATENT DOCUMENTS

| 8,670,288 | B2 | 3/2014 | Bjerkholt |
| 10,013,800 | B1 | 7/2018 | Mallet et al. |
| 10,948,617 | B2 * | 3/2021 | Qin .......................... G01V 1/362 |
| 2005/0038604 | A1 * | 2/2005 | Marin ....................... G01V 1/30 702/14 |
| 2009/0043507 | A1 * | 2/2009 | Dommisse ............... G01V 1/34 702/6 |

(Continued)

OTHER PUBLICATIONS

Totake et al. (Totake et al., Structural Validation as an Input Into Seismic Depth Conversion to Decrease Assigned Structural Uncertainty, Journal of Structural Geology 95, pp. 32-47, 2017) (Year: 2017).*

(Continued)

*Primary Examiner* — Raymond L Nimox
(74) *Attorney, Agent, or Firm* — Fish & Richardson P.C.

(57) ABSTRACT

Systems and methods include a computer-implemented method includes concurrently outputting, by a computing device to a display of the computing device, a graphical time-domain interpretation of seismic data, a graphical velocity model related to the seismic data, and a graphical depth-domain interpretation of the seismic data. The method may further include identifying, by the computing device, a first alteration to one of the time-domain interpretation, the velocity model, and the depth-domain interpretation. The method may further include identifying, by the computing device based on the first alteration, a second alteration to another of the time-domain interpretation, the velocity model, and the depth-domain interpretation. The method may further include updating, by the computing device based on the first alteration and the second alteration, at least two of the graphical time-domain interpretation, the graphical velocity model, and the graphical depth-domain interpretation. Other embodiments may be described or claimed.

20 Claims, 5 Drawing Sheets

(56) References Cited

U.S. PATENT DOCUMENTS

| | | | | |
|---|---|---|---|---|
| 2010/0299117 | A1* | 11/2010 | Bjerkholt | G01V 1/303 |
| | | | | 703/2 |
| 2011/0320182 | A1* | 12/2011 | Dommisse | G01V 1/34 |
| | | | | 703/10 |
| 2014/0081613 | A1* | 3/2014 | Dommisse | G06T 19/00 |
| | | | | 703/10 |
| 2015/0073715 | A1* | 3/2015 | Aarre | G01V 1/345 |
| | | | | 702/14 |
| 2016/0306806 | A1* | 10/2016 | Fackler | G06F 16/252 |
| 2019/0034812 | A1* | 1/2019 | Borrel | G06N 5/04 |
| 2019/0383965 | A1* | 12/2019 | Salman | G01V 99/005 |
| 2021/0102457 | A1* | 4/2021 | Dupont | G01V 1/50 |

OTHER PUBLICATIONS

Al-Chalabi, "Parameter nonuniqueness in velocity versus depth functions," Geophysics, May-Jun. 1997, 62(3):970-979.

Etris et al., "True depth conversion: More than a pretty picture," Recorder, CSEG, Nov. 2002, 26(9):1-19.

Totake et al., "Structural validation as an input into seismic depth conversion to decrease assigned structural uncertainty," Journal of Structural Geology, 2017, 95:32-47.

PCT International Search Report and Written Opinion in International Appln. No. PCT/US2021/052184, dated Jan. 14, 2022, 19 pages.

* cited by examiner

Identifying, in a display of an electronic device: a graphical display based on a time-domain interpretation of seismic data; a graphical display based on a velocity model related to the seismic data; a graphical display based on a depth-domain interpretation of the seismic data; and a graphical display based on a structural validation model related to the seismic data
402

Identifying an alteration to one of the time-domain interpretation, the velocity model, the depth-domain interpretation, and the structural validation model
404

Updating, based on the alteration, the graphical display of at least two of the time-domain interpretation, the velocity model, the depth-domain interpretation, and the structural validation model
406

PARALLELIZATION OF SEISMIC DATA-RELATED MODELLING

BACKGROUND

The present disclosure applies to the field of geophysical and geologic prospecting, and more particularly, to the analysis of seismic data. More specifically, embodiments relate to techniques related to interpretation and modelling of said seismic data.

Generally, having accurate maps may be desirable for oil and gas exploration activities, and broader subsurface management projects such as those involving freshwater aquifers and storage. For example, maps may be used for estimating hydrocarbon resources in the subsurface. Moreover, maps may be used as inputs in making drilling decisions. Such maps may be generated and stored as one or more numerical grids that may be produced from geological and geophysical data, specifically well formation depths and seismic data.

Seismic data may be initially acquired in the time-domain. Interpretations of this data may then be transformed into depth maps by way of a depth conversion procedure. The depth conversion procedure may rely on velocity models that are guided by information derived from seismic processing and, where available, drilled wells. In areas of complex subsurface structure, seismic data may be difficult to interpret.

SUMMARY

As noted, seismic data may be initially acquired in the time domain. Interpretations of the seismic data may be transformed into depth maps by way of a conversion procedure that relies on velocity models. In-between well control locations, velocity models may be non-unique, and the depth conversion process may be iterative and time-consuming, with multiple depth-map realizations. Moreover, depth conversion iterations may be confined to velocity model variants and may not take into account alternative time-domain interpretations. As a result, time-domain interpretation inaccuracies may not be corrected in any resultant maps. Additionally, the time required for such iteration from time-domain data to depth-domain data may be compounded in areas of geological complexity or low signal-to-noise seismic data. Therefore, time-constrained projects may not allow for a protracted sequence of iterations, resulting in sub-optimal uncertainty levels.

Embodiments herein may resolve one or more of these issues. Specifically, embodiments relate to techniques which may combine existing techniques and technologies on a software platform to concurrently or simultaneously display at least a time-domain interpretation of seismic data, a velocity model related to the seismic data, and a depth-domain interpretation of the seismic data. The software engine may instantly use the velocity model to convert the time interpretation into the depth display, thereby allowing the user to visualize alternative interpretations of the seismic data and manipulate the velocity model while being able to see the outcome of such manipulation in real-time. In some embodiments, a fourth domain, structural validation, may include a further simultaneous realization of the model wherein elements such as line-length and area-balance may simultaneously be monitored and manipulable with those alterations being instantly posted back on the other domains for visual cross-validation which may enhance validation workflows.

Freedom to interpret this data in either the time-domain or the depth-domain, combined with the ability to manipulate the velocity model and, optionally, conduct structural validation, may allow for rapid convergence of an accurate velocity model, seismic interpretation, and depth maps. As a result, embodiments may allow for significantly reduced interpretation project timelines and more accurate project economics.

In some implementations, a computer-implemented method includes concurrently outputting, by a computing device to a display of the computing device, a graphical time-domain interpretation of seismic data, a graphical velocity model related to the seismic data, and a graphical depth-domain interpretation of the seismic data. The method may further include identifying, by the computing device, a first alteration to one of the time-domain interpretation, the velocity model, and the depth-domain interpretation. The method may further include identifying, by the computing device based on the first alteration, a second alteration to another of the time-domain interpretation, the velocity model, and the depth-domain interpretation. The method may further include updating, by the computing device based on the first alteration and the second alteration, at least two of the graphical time-domain interpretation, the graphical velocity model, and the graphical depth-domain interpretation.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIG. 4 depicts an alternative example technique for displaying interpretations or models related to seismic data, in accordance with various embodiments.

Like reference numbers and designations in the various drawings indicate like elements.

DETAILED DESCRIPTION

Figure 1:
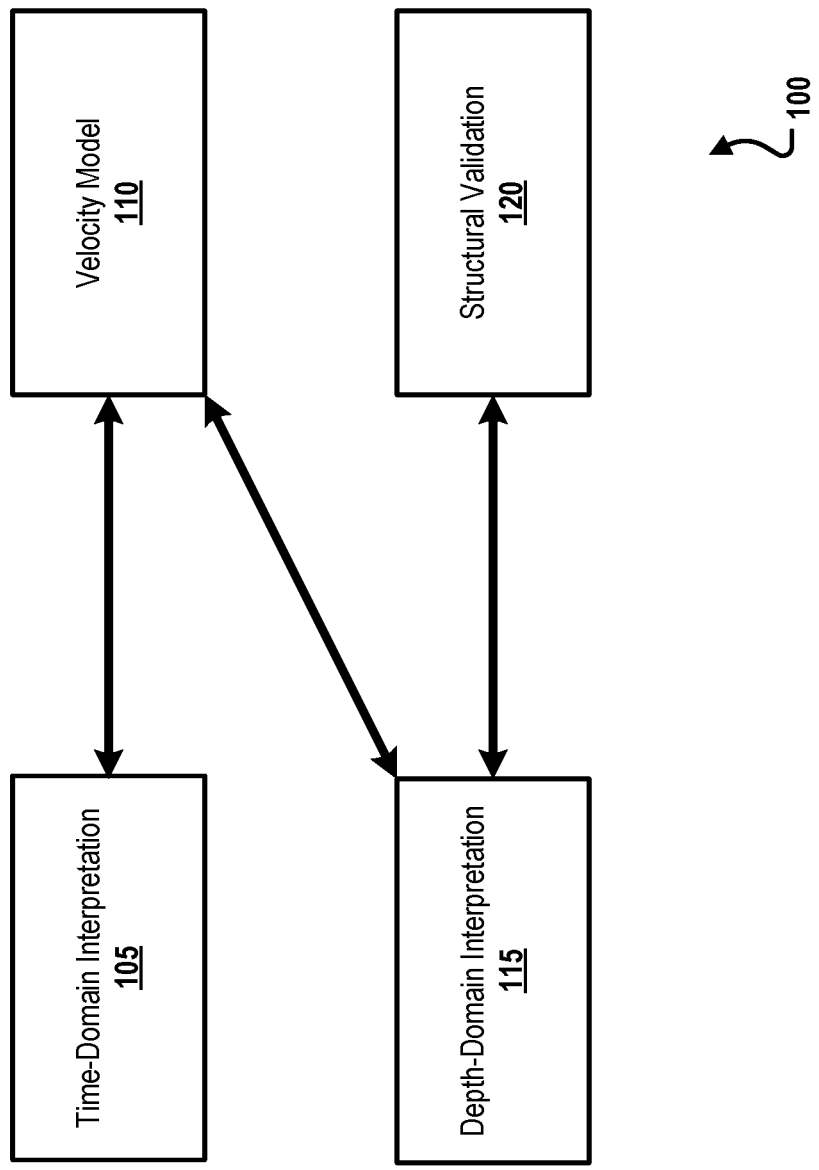
FIG. 1 depicts an example of a parallel workflow related to interpretation and modelling of seismic data, in accordance with various embodiments.

The following detailed description describes techniques for displaying, interpreting depth-converting, and validating the interpretation of seismic data. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Typically, reflection seismic data may be recorded in the field as a time lag between energy sourced at the surface, and then recorded as having reflected from rock layers at depth. This reflected data may be what is referred to as the time-domain data.

It may be desirable to then convert the time-domain data to the depth-domain by using an estimate of the seismic velocity through the rock on which the sounding procedure is being performed. The conversion from the time-domain to the depth-domain may be simplified as: Depth=Velocity*Time/2. In this conversion, "Depth" may be the depth of the structure that is being measured. "Time" may be the time difference between when the energy is sourced as the surface and the reflection is measured. "Velocity" may be the velocity of the signal propagating through each layer of rock, and may be based on a velocity model that is being used to model the structures of the rock layers through which the signal is propagating.

It may be desirable for the velocity model to account for different characteristics of various layers of the rock. For example, the signal may propagate with one velocity through a relatively dense layer of rock, while it may propagate with another velocity through a less dense layer of rock. As such, a variety of velocity models may be used to estimate the propagation characteristics of each layer of rock, the relative sizes or shapes of various layers of the rock, constants or transforms used to construct the velocity model, etc. For this reason, there is a link between the structure of the velocity model, in terms of subsurface boundaries between one velocity and another, and the interpretation of the rock structure itself which is the subject of the interpretation in time, or depth domains.

Each of the parameters described above—the time-domain interpretation, the depth-domain interpretation, and the velocity model—may vary in three dimensions (3D), but for ease of interpretation, modelling and interpretation may be performed in two-dimensional (2D) cross-sections that are later assembled into a 3D model. Generally, in legacy workflows, time-domain interpretation may be performed, followed by velocity model construction, and then by depth-conversion. In some embodiments, a subsequent quality-control analysis may be performed, such as structural validation. As used herein, "structural validation" may refer to geometrical methods used to test the acceptability of an interpretation. These techniques may include "viability" tests for geometrical permissibility such as line length and area balancing. More advanced viability tests may introduce mechanical properties such as time-dependent volume loss (compaction) and strain in relation to specified rock properties. In legacy workflows, the quality-control analysis may cause repeated iteration of the workflow described above, which may lead to protracted project timelines or, if time is limited, truncation of technical work before satisfactory results are obtained. In some situations, because of the extended timelines, uncertainties in the results may not be fully identified, and therefore a resultant depth map may include a misleading sense of accuracy.

By contrast, embodiments herein relate to the simultaneous or concurrent display of various interpretations or models related to the seismic data, such that one of the models or interpretations may be modified and a user may see how such a modification alters the other interpretations or models in real-time or near real-time. It will, however, be understood that in various real-world embodiments it may take a system a finite amount of processing time to update data or displays as a result of modification of data, and so as used herein the concept of "real-time" is used to indicate a time-frame in which two events happen close together with the assumption that that finite lag may occur due to the capabilities of the processor of the electronic system. In some embodiments, the lag may be on the order of less than or equal to approximately 1 second and may be, for example 1 second, 0.5 seconds, or on the order of a few milliseconds to tens of milliseconds. However, it will be understood that these timeline are intended as examples and, in other embodiments, the lag may be greater or smaller than described.

It will also be noted that the terms "simultaneous" and "concurrent" may be used herein as synonyms for one another, and may be used to refer to two things being displayed on the screen at generally the same time.

FIG. 1 depicts an example of a parallel workflow 100 related to interpretation and modelling of seismic data, in accordance with various embodiments. Specifically, FIG. 1 is intended to illustrate how changes to one interpretation or model may affect one or more of the other interpretations or models. For example, as described above, the workflow 100 may include a time-domain interpretation 105, a velocity model 110, a depth-domain interpretation 115, and structural validation 120. The arrows in the workflow 100 are intended to indicate how a change to one element of the workflow 100 (e.g., the time-domain interpretation 105) may be reflected in updates to other elements of the workflow 100 (e.g., one or more of the velocity model 110, the depth-domain interpretation, or the structural validation 120). Similarly, a change to an element such as the depth-domain interpretation 115 may be reflected in updates to other elements of the workflow 100 (e.g., the time-domain interpretation 105, the velocity model 110, and the structural validation 120) as described above.

Figure 2:
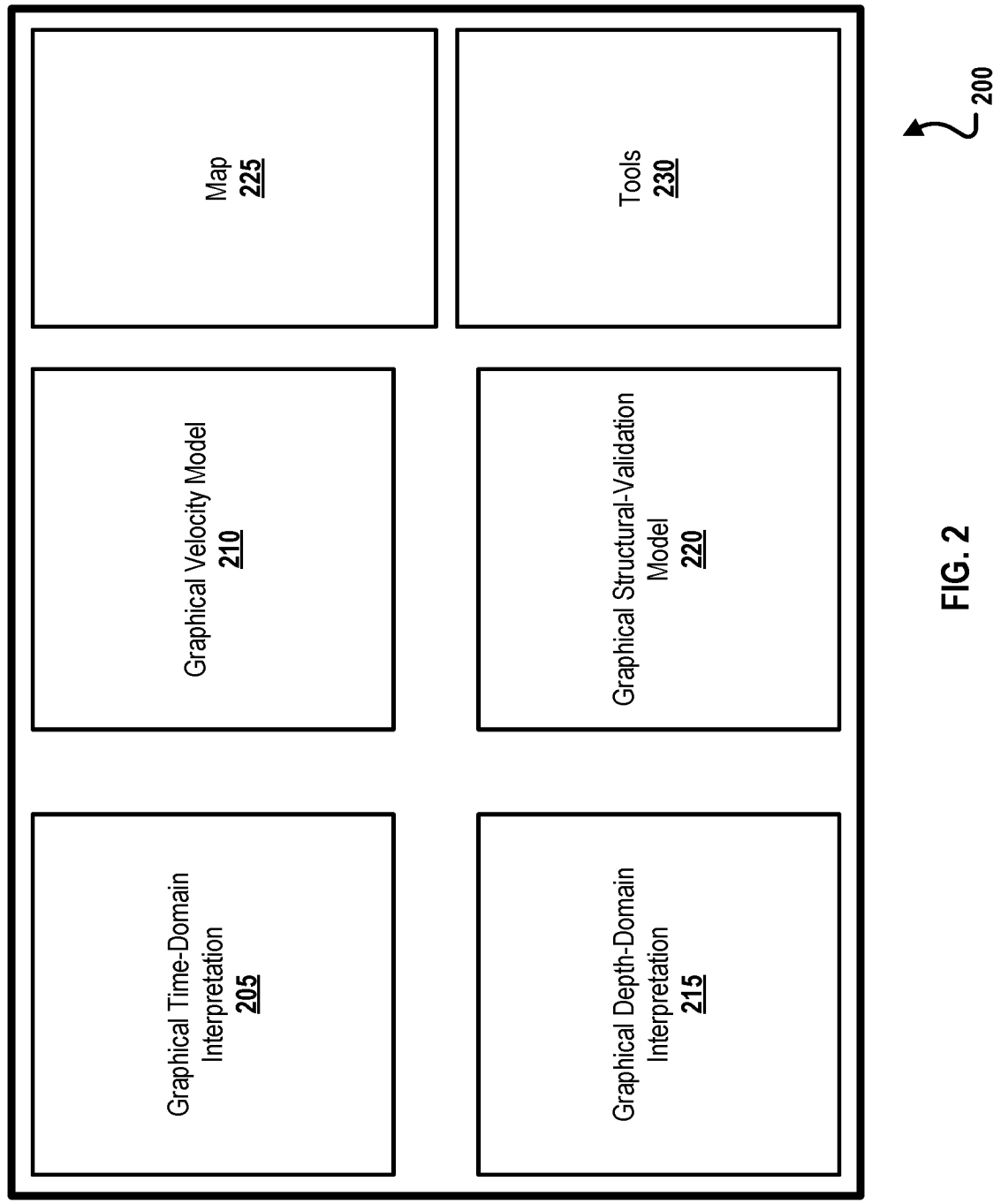
FIG. 2 depicts an example graphical display related to the parallel workflow of FIG. 1, in accordance with various embodiments.

FIG. 2 depicts an example graphical display 200 related to the parallel workflow 100 of FIG. 1, in accordance with various embodiments. The graphical display may include, for example, a graphical time-domain interpretation 205 of the seismic data, which may be based on, for example, the time-domain interpretation 105 of the seismic data from FIG. 1. The graphical display 200 may further include a graphical velocity model 210 which may be a graphical depiction of, for example, the velocity model 110 of FIG. 1. The graphical display 200 may further include a graphical depth-domain interpretation 215 of the seismic data, which may be based on, for example, the depth-domain interpretation 115 of the seismic data from FIG. 1. The graphical display 200 may further include a graphical structural validation model 220 which may be based on, for example, the structural validation model 120 of FIG. 1.

The graphical display 200 may further include additional elements such as a map 225, which may show the location of the study line of section that is displayed in the time, depth, velocity, and validation domains. The map may also contain other relevant data such a nearby wells. Moreover, the map may also contain the full-time or depth version of the mapped surface, which may update in real time according to the workflow. In other words, the influence of changes made in any of the cross section domains (time/velocity/depth/validation) may be manifest in the map-view version of the surface or horizon that was changed. A criterion or criteria specifying the distance and weighting of these updates based on cross section edits would be under user control.

As noted, the various elements of the graphical display 200 may be rendered as 2D cross-sectional views, and the map 225 may be a map showing where that cross-section may be taken. For example, the map 225 may depict an overhead view, a 3D view, or some other view of the overall rock upon which the seismic data is based, and indicate which views are being depicted by, for example, the graphical time-domain interpretation 205, the graphical velocity model 210, the graphical depth-domain interpretation 215, etc. It is also possible for map 225 to contain the full version of the grid from which the time interpretation 205 or depth representation 215 is drawn. Moreover, the computer software could also update map 225 in real time as changes are made to the line of section represented in elements 205, 210, 215 and 220, via a distance of influence function in the map domain.

Additionally, the graphical display 200 may include an indication of tools 230 which may be used to manipulate or otherwise interact with different portions of the display 200. For example, the tools 230 may include a tool to zoom in or out of various of the elements of the display, a lasso tool or other type of selection tool to select certain parts of the interpretations or models depicted by the display 200, tools to change or otherwise manipulate the data upon which the interpretations or models are based, etc.

It will be understood that the graphical display 200 of FIG. 2 is intended as a high-level example embodiment. In various embodiments, the graphical display 200 may be interacted with in different manners. For example, in one embodiment, certain of the elements of the graphical display such as the graphical time-domain interpretation 205, the graphical depth-domain interpretation 215, etc. may be interacted with directly. For example, a user may highlight a certain point of the various models or interpretations and alter them by dragging a point, double clicking a point, entering a keyboard or mouse command, etc. In other embodiments, the graphical display may have an additional portion where data related to an interpretation or model of the graphical display 200 is displayed, and a user may make edits to the raw data.

In some embodiments, different portions of the graphical display 200 may be displayed differently than depicted in FIG. 2. For example, in some embodiments one or more of the elements of the graphical display 200 (e.g., the graphical time-domain interpretation 205, the graphical velocity model 210, the graphical depth-domain interpretation 215, the graphical structural validation model 220, the map 225, the tools 230, etc.) may have a different relative size, shape, orientation, or location within the graphical display 200. In some embodiments, additional elements may be present (e.g., a portion of the graphical display 200 where a user may edit raw data related to the various models or interpretations), or certain elements of the graphical display (e.g., the graphical structural validation model 220) may not be present. In some embodiments, additional graphical elements such as borders may be present in the graphical display to separate, for example, the various interpretations or models from the map 225 or the tools 230. Other variations may be present in other embodiments.

Figure 3:
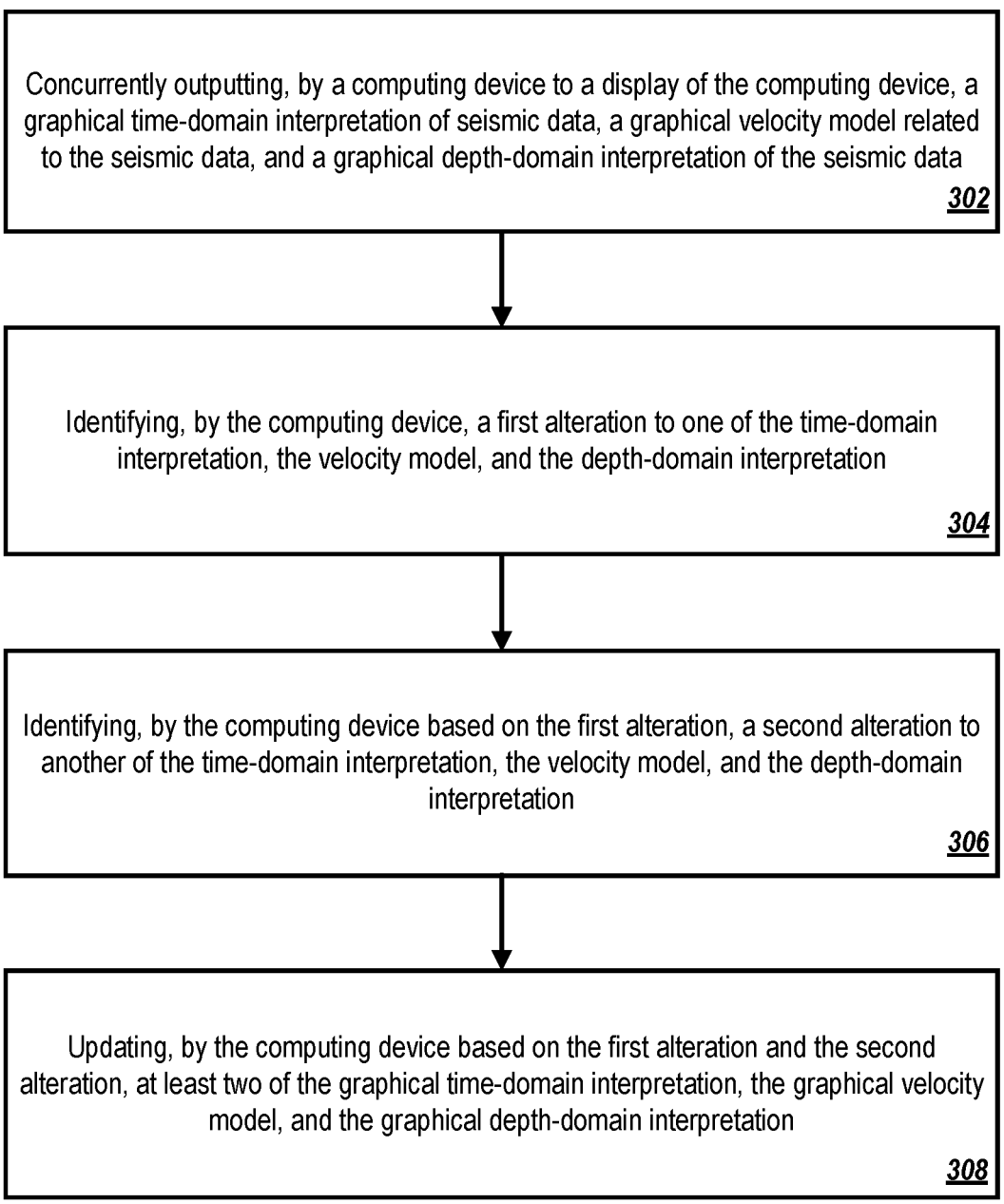
FIG. 3 depicts an example technique for displaying interpretations or models related to seismic data, in accordance with various embodiments.

FIG. 3 depicts an example technique 300 for displaying interpretations or models related to seismic data, in accordance with various embodiments. For clarity of presentation, the description that follows generally describes technique 300 in the context of the other Figures in this description. However, it will be understood that technique 300 can be performed, for example, by any suitable system, environment, software, and hardware, or a combination of systems, environments, software, and hardware, as appropriate. In some implementations, various steps of technique 300 can be run in parallel, in combination, in loops, or in any order.

The technique 300 may include concurrently outputting, at 302 by a computing device to a display of the computing device (e.g., graphical display 200), a graphical time-domain interpretation of seismic data (e.g., graphical time-domain interpretation 205), a graphical velocity model related to the seismic data (e.g., graphical velocity model 210), and a graphical depth-domain interpretation of the seismic data (e.g., graphical depth-domain interpretation 215).

The technique 300 may further include identifying, at 304 by the computing device, a first alteration to one of the time-domain interpretation (e.g., time-domain interpretation 105), the velocity model (e.g., velocity model 110), and the depth-domain interpretation (e.g., depth-domain interpretation 115). This alteration may be, for example, an alteration to the various interpretations or models upon which the graphical depiction relies. In some embodiments, the alteration may be, for example, an alteration to the underlying data as described above. In other embodiments, the alteration may be, for example, an alteration using a tool such as one or more of the tools described above with respect to the tools 230 portion of the graphical display 200.

The technique 300 may further include identifying, at 306 by the computing device based on the first alteration, a second alteration to another of the time-domain interpretation, the velocity model, and the depth-domain interpretation. For example, if the first alteration is an alteration related to the velocity model, then the second alteration may be an update to the time-domain interpretation or the depth-domain interpretation that is based on the alteration to the velocity model. The user would be free to lock any domain, if so desired, via tools elements 205, 210, 215 or 220, or in the tools window 230, such that alteration to, for example velocity model 210 produced update only to the depth domain interpretation 215.

The technique 300 may further include updating, at 308 by the computing device based on the first alteration and the second alteration, at least two of the graphical time-domain interpretation the graphical velocity model, and the graphical depth-domain interpretation. For example, if the first alteration is an alteration related to the velocity model 110, and the second alteration is an update to the time-domain interpretation 105 based on the first alteration, then the computing device at 308 may update the corresponding graphical velocity model 210 and graphical time-domain interpretation 205. As previously discussed, this update may be in real-time, or near real-time, so that a user may see how a change in one model or interpretation affects other models or interpretations related to the seismic data.

FIG. 4 depicts an alternative example technique 400 for displaying interpretations or models related to seismic data, in accordance with various embodiments. For clarity of presentation, the description that follows generally describes technique 400 in the context of the other Figures in this description. However, it will be understood that technique 400 can be performed, for example, by any suitable system, environment, software, and hardware, or a combination of systems, environments, software, and hardware, as appropriate. In some implementations, various steps of technique 400 can be run in parallel, in combination, in loops, or in any order.

The technique 400 may include identifying, at 402 in a display of an electronic device such as graphical display 200, a graphical display (e.g., element 205) based on a time-domain interpretation of seismic data (e.g., element 105); a graphical display (e.g., element 210) based on a velocity model (e.g., element 110) related to the seismic data; a graphical display (e.g., element 215) based on a depth-domain interpretation (e.g., element 115) of the seismic data; and a graphical display (e.g., element 220) based on a structural validation model (e.g., element 120) related to the seismic data The technique 400 may further include identifying, at 404, an alteration to one of the time-domain interpretation, the velocity model, the depth-domain interpretation, and the structural validation model. The alteration may be similar to, for example, the alteration discussed above with respect to element 304.

The technique 400 may further include updating, at 406 based on the alteration, the graphical display of at least two of the time-domain interpretation, the velocity model, the depth-domain interpretation, and the structural validation model. For example, if the alteration at 404 is an alteration to the depth-domain interpretation 115, then at element 406 the graphical depth-domain interpretation 215 and/or the graphical time-domain interpretation 205 (and/or some other element of the graphical display 200) may be updated. This update may occur in real-time or near real-time as described above.

It will be understood that FIGS. 3 and 4 are intended as high-level example Figures and techniques of other embodiments may vary. For example, in some embodiments certain elements may be performed in a different order than depicted, or concurrently with one another. In some embodiments, the techniques may include more or fewer elements than are depicted or described. Other variations may be present.

Figure 5:
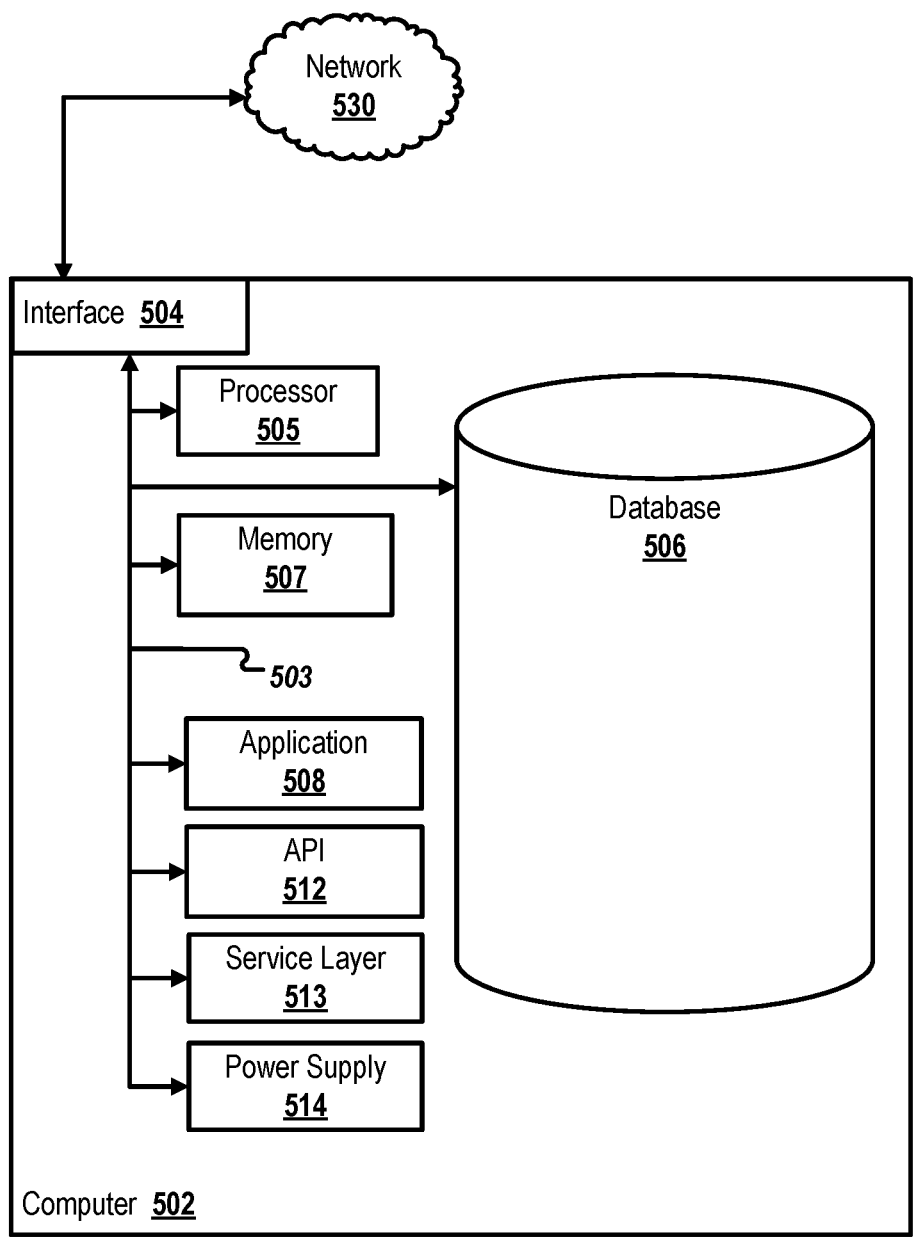
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a top level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both) over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Described implementations of the subject matter can include one or more features, alone or in combination.

For example, in a first implementation, a computer-implemented method includes concurrently outputting, by a computing device to a display of the computing device, a graphical time-domain interpretation of seismic data, a graphical velocity model related to the seismic data, and a graphical depth-domain interpretation of the seismic data; identifying, by the computing device, a first alteration to one of the time-domain interpretation, the velocity model, and the depth-domain interpretation; identifying, by the computing device based on the first alteration, a second alteration to another of the time-domain interpretation, the velocity model, and the depth-domain interpretation; and updating, by the computing device based on the first alteration and the second alteration, at least two of the graphical time-domain interpretation, the graphical velocity model, and the graphical depth-domain interpretation.

The foregoing and other described implementations can each, optionally, include one or more of the following features:

A first feature, combinable with any of the following features, where the graphical time-domain interpretation is to be displayed in a first portion of the display, the graphical velocity model is to be displayed in a second portion of the display, and the graphical depth-domain interpretation is to be displayed in a third portion of the display.

A second feature, combinable with any of the previous or following features, where the method further includes outputting, by the computing device concurrently with the graphical time-domain interpretation, the graphical velocity model, the graphical depth-domain interpretation, and a graphical structural validation model related to the depth-domain interpretation.

A third feature, combinable with any of the previous or following features, where the first alteration is an alteration to the velocity model.

A fourth feature, combinable with any of the previous or following features, where the first alteration is an alteration to the depth-domain interpretation.

A fifth feature, combinable with any of the previous or following features, where the first alteration is an alteration to the time-domain interpretation.

A sixth feature, combinable with any of the previous or following features, where the depth-domain interpretation is based on the velocity model and the time-domain interpretation of the seismic data.

In a second implementation, a non-transitory, computer-readable medium stores one or more instructions executable by a computer system to perform operations including identify, in a display of an electronic device: a graphical display based on a time-domain interpretation of seismic data; a graphical display based on a velocity model related to the seismic data; a graphical display based on a depth-domain interpretation of the seismic data; and a graphical display based on a structural validation model related to the depth-domain interpretation of the seismic data; identify an alteration to one of the time-domain interpretation, the velocity model, the depth-domain interpretation, and the structural validation model; and update, based on the alteration, the graphical display of at least two of the time-domain interpretation, the velocity model, the depth-domain interpretation, and the structural validation model.

The foregoing and other described implementations can each, optionally, include one or more of the following features:

A first feature, combinable with any of the following features where the graphical display based on the time-domain interpretation of seismic data is in a first portion of the display of the electronic device; the graphical display based on the velocity model related to the seismic data is in a second portion of the display of the electronic device; the graphical display based on the depth-domain interpretation of the seismic data is in a third portion of the display of the electronic device; and the graphical display based on the structural validation model related to the seismic data is in a fourth portion of the display of the electronic device.

A second feature, combinable with any of the previous or following features, where the alteration is an alteration to the velocity model.

A third feature, combinable with any of the previous or following features, where the alteration is an alteration to the depth-domain interpretation.

A fourth feature, combinable with any of the previous or following features, where the alteration is an alteration to the time-domain interpretation.

A fifth feature, combinable with any of the previous or following features, where the alteration is an alteration to the structural validation model.

A sixth feature, combinable with any of the previous or following features, where the operations further include: identify, in the display of the electronic device, a graphical display related to a map, where the map is to identify a location at which the seismic data was measured; and update, based on the alteration, the graphical display related to the map.

In a third implementation, an electronic device includes: a display to display: a graphical display based on a time-domain interpretation of seismic data; a graphical display based on a velocity model related to the seismic data; and a graphical display based on a depth-domain interpretation of the seismic data. The electronic device further includes one or more processors communicatively coupled with the display, where the one or more processors are to: identify an alteration to one of the time-domain interpretation, the velocity model, and the depth-domain interpretation; and update, based on the alteration, the graphical display of at least two of the time-domain interpretation, the velocity model, and the depth-domain interpretation.

The foregoing and other described implementations can each, optionally, include one or more of the following features:

A first feature, combinable with any of the following features, where the display is further to display a structural validation model related to the seismic data; and the one or more processors are to update, based on the alteration, the structural validation model.

A second feature, combinable with any of the previous or following features, where the alteration is an alteration to the velocity model.

A third feature, combinable with any of the previous or following features, where the alteration to the velocity model is an alteration to a type of the velocity model or a constant of the velocity model.

A fourth feature, combinable with any of the previous or following features, where the alteration is an alteration to the depth-domain interpretation.

A fifth feature, combinable with any of the previous or following features, where the alteration is an alteration to the time-domain interpretation.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various Figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A method comprising:
concurrently outputting, by a computing device to a display of the computing device, a graphical time-domain interpretation of seismic data, a graphical velocity model related to the seismic data, and a graphical depth-domain interpretation of the seismic data;
identifying, by the computing device, a first alteration to one of the graphical time-domain interpretation, the graphical velocity model, and the graphical depth-domain interpretation;
identifying, by the computing device based on the first alteration, a second alteration to another of the graphical time-domain interpretation, the graphical velocity model, and the graphical depth-domain interpretation; and
updating, by the computing device based on the first alteration and the second alteration, at least two of the graphical time-domain interpretation, the graphical velocity model, and the graphical depth-domain interpretation.

2. The method of claim 1, wherein the graphical time-domain interpretation is to be displayed in a first portion of the display, the graphical velocity model is to be displayed in a second portion of the display, and the graphical depth-domain interpretation is to be displayed in a third portion of the display.

3. The method of claim 1, further comprising outputting, by the computing device concurrently with the graphical time-domain interpretation, the graphical velocity model, the graphical depth-domain interpretation, and a graphical structural validation model related to the graphical depth-domain interpretation.

4. The method of claim 1, wherein the first alteration is an alteration to the graphical velocity model.

5. The method of claim 1, wherein the first alteration is an alteration to the graphical depth-domain interpretation.

6. The method of claim 1, wherein the first alteration is an alteration to the graphical time-domain interpretation.

7. The method of claim 1, wherein the graphical depth-domain interpretation is based on the graphical velocity model and the graphical time-domain interpretation of the seismic data.

8. One or more non-transitory computer-readable media comprising instructions that, upon execution of the instructions by one or more processors of an electronic device, are to cause the electronic device to:
identify, in a display of an electronic device:
a graphical display based on a time-domain interpretation of seismic data;
a graphical display based on a velocity model related to the seismic data;
a graphical display based on a depth-domain interpretation of the seismic data; and
a graphical display based on a structural validation model related to the depth-domain interpretation of the seismic data;
identify an alteration to one of the time-domain interpretation, the velocity model, the depth-domain interpretation, and the structural validation model; and update, based on the alteration, the graphical display of at least two of the time-domain interpretation, the velocity model, the depth-domain interpretation, and the structural validation model.

9. The one or more non-transitory computer-readable media of claim 8, wherein:
the graphical display based on the time-domain interpretation of seismic data is in a first portion of the display of the electronic device;
the graphical display based on the velocity model related to the seismic data is in a second portion of the display of the electronic device;
the graphical display based on the depth-domain interpretation of the seismic data is in a third portion of the display of the electronic device; and
the graphical display based on the structural validation model related to the seismic data is in a fourth portion of the display of the electronic device.

10. The one or more non-transitory computer-readable media of claim 8, wherein the alteration is an alteration to the velocity model.

11. The one or more non-transitory computer-readable media of claim 8, wherein the alteration is an alteration to the depth-domain interpretation.

12. The one or more non-transitory computer-readable media of claim 8, wherein the alteration is an alteration to the time-domain interpretation.

13. The one or more non-transitory computer-readable media of claim 8, wherein the alteration is an alteration to the structural validation model.

14. The one or more non-transitory computer-readable media of claim 8, wherein the instructions are further to:
identify, in the display of the electronic device, a graphical display related to a map, wherein the map is to identify a location at which the seismic data was measured; and
update, based on the alteration, the graphical display related to the map.

15. An electronic device comprising:
a display to display:
a graphical display based on a time-domain interpretation of seismic data;
a graphical display based on a velocity model related to the seismic data; and
a graphical display based on a depth-domain interpretation of the seismic data; and
one or more processors communicatively coupled with the display, wherein the one or more processors are to:
identify an alteration to one of the time-domain interpretation, the velocity model, and the depth-domain interpretation; and
update, based on the alteration, the graphical display of at least two of the time-domain interpretation, the velocity model, and the depth-domain interpretation.

16. The electronic device of claim 15, wherein:
the display is further to display a structural validation model related to the seismic data; and
the one or more processors are to update, based on the alteration, the structural validation model.

17. The electronic device of claim 15, wherein the alteration is an alteration to the velocity model.

18. The electronic device of claim 17, wherein the alteration to the velocity model is an alteration to a type of the velocity model or a constant of the velocity model.

19. The electronic device of claim 15, wherein the alteration is an alteration to the depth-domain interpretation.

20. The electronic device of claim 15, wherein the alteration is an alteration to the time-domain interpretation.

* * * * *